115,694

UNITED STATES PATENT OFFICE.

WILLIAM R. BUNNELL, OF JERSEY CITY, NEW JERSEY.

IMPROVEMENT IN COMPOSITIONS FOR STEAM-PACKINGS.

Specification forming part of Letters Patent No. 115,694, dated June 6, 1871.

I, WILLIAM R. BUNNELL, of Jersey City, in the county of Hudson and State of New Jersey, have invented an Improved Composition for Steam-Packing, and suitable also for a packing for journal-boxes.

I form my composition of the follow ingredients, in about the proportions following, viz.: asbestus, eighty parts; plumbago, fifteen parts; rock-salt, five parts. The plumbago and rock-salt in a finely-pulverized state are mixed together, and are then thoroughly incorporated with the asbestus by agitation and trituration, or in any manner that will effect an equal or nearly equal distribution of the pulverulent and fibrous ingredients, when it is ready for use.

The fibrous structure of the asbestus gives the requisite elasticity to insure a good packing; both this ingredient and the plumbago are indestructible by heat, while the anti-friction properties of the latter render the packing self-lubricating, and particularly adapt it to use in the pistons of steam-engines, and in other like situations where ordinary packings are rapidly destroyed by the combined effect of heat and friction. The refrigerating effect of the rock-salt also prevents excessive heating, and obviates friction by producing a glaze or high polish on the surfaces which move in contact with each other.

These properties, which act in harmony when the ingredients are so combined, render the packing very durable, and especially valuable for steam purposes and for rapidly-revolving journals, like those of car-wheels, by preventing overheating.

I claim as my invention—

The herein-described composition for steam and other packing, consisting of asbestus, plumbago, and rock-salt, combined substantially in the proportions specified.

In witness whereof I have hereunto signed my name in the presence of two subscribing witnesses.

WM. R. BUNNELL.

Witnesses:
  GEORGE HARRIOT,
  SAMUEL D. PINE.